United States Patent
Hatakeyama (10) Patent No.: US 6,989,936 B2
(45) Date of Patent: Jan. 24, 2006

(54) VARIABLE POWER OPTICAL SYSTEM

(75) Inventor: Koshi Hatakeyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/794,120

(22) Filed: Mar. 4, 2004

(65) Prior Publication Data

US 2004/0174611 A1    Sep. 9, 2004

(30) Foreign Application Priority Data

Mar. 7, 2003    (JP)    ............... 2003-061613

(51) Int. Cl.
G02B 9/00    (2006.01)

(52) U.S. Cl. .................. 359/649; 359/676; 359/727; 359/733

(58) Field of Classification Search ........ 359/649–651, 359/676–692, 726–731, 733–736
See application file for complete search history.

(56) References Cited

U.S. PATENT DOCUMENTS

| | | | |
|---|---|---|---|
| 5,323,263 A | 6/1994 | Schoenmakers | |
| 5,515,207 A | 5/1996 | Foo | |
| 6,023,321 A * | 2/2000 | Shiraishi | 355/53 |
| 6,166,866 A | 12/2000 | Kimura et al. | 359/729 |
| 6,473,243 B1 * | 10/2002 | Omura | 359/730 |
| 6,522,475 B2 | 2/2003 | Akiyama et al. | 359/676 |
| 6,639,729 B2 | 10/2003 | Tanaka et al. | 359/676 |
| 2002/0008853 A1 | 1/2002 | Sunaga | 353/68 |
| 2002/0027720 A1 * | 3/2002 | Nishikawa et al. | 359/678 |
| 2002/0131184 A1 | 9/2002 | Yasui | 359/680 |

FOREIGN PATENT DOCUMENTS

| | | |
|---|---|---|
| EP | 0790513 | 8/1997 |
| EP | 1220538 | 7/2002 |
| FR | 2 705 795 | * 12/1994 |
| JP | 08-292371 | 11/1996 |
| JP | 08-292372 | 11/1996 |
| JP | 09-005650 | 1/1997 |
| JP | 09-222561 | 8/1997 |
| JP | 10-282451 | 10/1998 |
| JP | 11-109227 | 4/1999 |
| JP | 2000-089227 | 3/2000 |
| JP | 2001-255462 | 9/2001 |
| JP | 2002-182110 | 6/2002 |

* cited by examiner

Primary Examiner—Jordan M. Schwartz
(74) Attorney, Agent, or Firm—Morgan & Finnegan, LLP (57) ABSTRACT

The optical system disclosed in this specification is a variable power optical system for enlarging and projecting a reduction side object onto an enlargement side image plane, or reducing and projecting an enlargement side object onto a reduction side image plane. This variable power optical system includes a first optical component having a reflecting curved surface, and a second optical component disposed more toward the reduction side than the first optical component. The second optical component has a plurality of movable lens units, and the variable power optical system effects a variable power operation by movement of the plurality of lens units. If ray was traced from the reduction side toward the enlargement side, the second optical component forms an image of a reduction side conjugate point on the enlargement side than an optical surface of the first optical component that is most adjacent to the reduction side.

6 Claims, 11 Drawing Sheets

FIG. 2A WIDE
FIG. 2B MIDDLE
FIG. 2C TELE

FIG. 3

FIG. 4A WIDE

FIG. 4B MIDDLE

FIG. 4C TELE

FIG. 5A WIDE

FIG. 5B MIDDLE

FIG. 5C TELE

VARIABLE POWER OPTICAL SYSTEM

BACKGROUND OF THE INVENTION

1. Field of the Invention

This invention relates to a variable power optical system, and particularly to a variable power optical system for enlarging and projecting, for example, an original image onto a projection surface such as a screen in a fashion in which the magnification thereof can be varied.

2. Description of the Related Art

In recent years, along with the extensive utilization of portable computers such as notebook type personal computers and mobile computers, projection type display apparatuses including forward projection type front projectors have been widely used to enlarge and display images prepared on computers in conference or presentation at offices. Further, along with the permeation of digital versatile disks (DVDs) into the general market and the diversification and higher definition of video information distribution such as digital broadcasting, image appreciation on large screens has also come to be done by the use of projectors in homes.

Heretofore, a refraction optical system comprised of a plurality of lenses has been widely used as a projection optical system for a projector. When an optical system of this kind is used as a projection display apparatus like a front projector, the center of the image field is designed to be at a location deviated from the optical axis of the optical system in order to secure an observer's field of view. This is effected with a panel surface made parallel-decentered from the optical axis within an angle ensured by the optical system, that is, by the use of a part of an effective angle of view, and therefore, to shift the screen greatly from the optical axis, it is necessary to let the optical system have a sufficiently wide angle of view. Further, it is also necessary to suppress various aberrations including chromatic aberration of magnification liable to occur strongly with a higher angle of view. Also, regarding rear projection in which projection from the rear is effected onto a screen, the compactness of an apparatus is demanded and therefore, a very wide angle of view is required even if the image field is not shifted from the optical axis. Again in this case, the correction of chromatic aberration of magnification which greatly governs the quality of an image must be done sufficiently.

In such a background, in order to appreciate a large screen under diversified use environments of limited space, brightness and higher definition and yet, further compactness, a wider angle of view, higher variable power, etc. are required of the projection optical system.

Japanese Patent Application Laid-Open No. H11-109227 and Japanese Patent Application Laid-Open No. 2002-182110 realize a wide angle of view by the use of a coaxial optical system. In Japanese Patent Application Laid-Open No. H11-109227, the ratio between the focal length of a total system and the focal length of a front unit is regulated by a construction comprising a front unit and a rear unit to thereby effect the correction of spherical aberration and coma while maintaining the spacing between the units, a back focal length and telecentricity. Thereby, a wide angle of view equal to or greater than a half angle of view 35° is realized while the spacing between the units for inserting a folding mirror thereinto for the downsizing by the layout of the back focal length and the optical system which enables a dichroic mirror to be inserted is secured.

Japanese Patent Application No. 2002-182110, in a zoom lens of a five-unit construction, appropriately sets a diffraction optical element in a predetermined lens unit, and corrects chromatic aberration of magnification and at the same time, achieves the downsizing of the entire lens system. Thereby, this publication proposes a zoom lens securing a variable power ratio of 1.2 or greater and a great aperture of Fno of the order of 2, and yet having its various aberrations corrected sufficiently, and maintaining a back focal length and telecentricity.

On the other hand, in front projection, in order to effect image projection without hampering the observer's field of view and for the downsizing of real projection, there has been made an invention of a projection optical system capable of obliquely projecting onto a screen. However, so-called trapezoidal distortion is caused by obliquely projecting onto the screen and therefore, there has been made an invention for correcting this trapezoidal distortion. For example, in Japanese Patent Application Laid-Open No. H10-282451, the trapezoidal distortion is corrected by the use of an eccentric aspherical surface.

In a non-coaxial optical system, as a designing method therefor and a calculating method for a paraxial amount such as the focal length thereof are shown in Japanese Patent Application Laid-Open No. H09-5650, and examples of the design thereof are shown in Japanese Patent Application Laid-Open No. H08-292371, Japanese Patent Application Laid-Open No. H08-292372 and Japanese Patent Application Laid-Open No. H09-222561, it has become apparent that by introducing the concept of a reference axis and making a constituent surface into an asymmetrical aspherical surface, it is possible to construct an optical system having its aberrations corrected sufficiently. Such a non-coaxial optical system is called an off-axial optical systems (an optical system defined as an optical system including a curved surface (off-axial curved surface) in which, when considering a reference axis along a ray passing through the center of the image and the center of the pupil, a surface normal at the point of intersection of the constituent surface with the reference axis is not on the reference axis, and at this time, the reference axis assumes a shape that the reference axis is folded down). This off-axial optical system is such that the constituent surface thereof generally is non-coaxial and eclipse does not occur even on the reflecting surface thereof and therefore, makes it easy to construct an optical system using a reflecting surface. Also, it forms an intermediate image in the optical system to thereby constitute an optical system having a wide angle of view and yet being compact. Further, it is an optical system having a front stop and yet, enables a design or development of an optical path to be effected relatively freely and therefore can constitute a compact optical system. By making the most of these, Japanese Patent Application Laid-Open No. 2001-255462 and Japanese Patent Application Laid-Open No. 2000-89227 correct the trapezoidal distortion by the use of a rotationally asymmetrical reflecting surface having a curvature.

In Japanese Patent Application Laid-Open No. H11-109227, it is expected that as a wider angle of view progresses to a half angle of view of 40° or greater in the future, it will become difficult to maintain the optical system compact while correcting various aberrations including chromatic aberration of magnification. Further, in an embodiment, the optical system does not have the focal length changing function and therefore, it is good when it is used at a fixed angle of view as in rear projection, but is unsuitable for use in front projection.

In Japanese Patent Application Laid-Open No. 2002-182110, a diffraction optical element is used to thereby decrease the number of lenses and suppress chromatic aberration of magnification, but the variable power ratio is limited to 1.2, and a fundamental solution for increasing the variable power ratio is not done and therefore, a greatly wider angle of view and a greatly higher variable ratio cannot be expected.

Japanese Patent Application Laid-Open No. H10-282451 corrects trapezoidal distortion by a decentered aspherical surface, but the shift amount of the image plane is limited, and from the point that it is not telecentric relative to a liquid crystal panel, it is unsuitable for a projector. Also, Japanese Patent Application Laid-Open No. 2001-255462 and Japanese Patent Application Laid-Open No. 2000-89227 realize the correction of the trapezoidal distortion of a wide angle of view by the use of a rotationally asymmetrical reflecting surface having a curvature, but these techniques are specialized into a technique for effecting oblique projection, and are not an embodiment having the focal length changing function.

Also, in an image pickup system, in Japanese Patent Application Laid-Open No. H09-222561, use is made of an optical element constituted by a refracting surface coaxial with an integrally shaped optical element having surface mirrors decentered to each other, and the relative position of at least two elements is changed to thereby effect a focal length change. However, when ray tracing from an image pickup element side is done, the coaxial optical system effects substantially one-to-one imaging at a wide angle end between it and a reflecting optical system, and at a telephoto end, the magnification borne by the reflecting optical system becomes higher. Therefore, various aberrations caused in the coaxial optical system having the focal length changing function are enlarged by the reflecting optical system and the various aberrations become uncorrectable. Also, the coaxial optical system once images between it and the reflecting optical system, and enlarges the image by the reflecting optical system and therefore, is unsuitable for the downsizing of the optical system even if the sharing of the magnification of the coaxial optical system is heightened to suppress the enlargement of the aberrations by the reflecting optical system.

In Japanese Patent Application Laid-Open No. 2001-264633, use is made of an optical system provided with an optical element having a plurality of optical acting surfaces including at least one reflecting surface, and in which the disposition direction of adjacent ones of these optical acting surfaces is defined as a lengthwise direction, characterized in that the optical element is inserted into or removed from an optical path in a direction differing from the lengthwise direction to thereby change the paraxial amount of the system. This, in addition to the variable power function of the coaxial optical system on a reduction side, makes a reflecting optical block on an enlargement side interchangeable with one having a different focal length, and widens the range of variable power of the entire optical system. However, the magnification when the image pickup element of the coaxial optical system of the embodiment is regarded as an object plane is −0.59 at the wide angle end, −0.87 at the middle and −1.23 at the telephoto end, and particularly at the wide angle end, the magnification borne by the reflecting optical block is high and therefore, this also is an optical system liable to enlarge aberrations.

SUMMARY OF THE INVENTION

In view of the above-noted points, the present invention has as its object to propose a variable power optical system of a compact construction for obtaining a desired variable power ratio, and yet suppressing the occurrence of various aberrations such as chromatic aberration of magnification, etc.

In order to solve the above-noted problems, a variable power optical system as an example of the present invention is a variable power optical system which enlarges and projects a reduction side image onto a predetermined image plane on an enlargement side, or reduces and projects an enlargement side image onto a predetermined image plane on the reduction side. This variable power optical system has a first optical component and a second optical component disposed more toward the reduction side than the first optical component. The first optical component is provided with a reflecting curved surface. The second optical component has a plurality of movable lens units, and effects a focal length change by the movement of the plurality of lens units. If ray was traced from the reduction side toward the enlargement side, the second optical component forms an image of a reduction side conjugate point on the enlargment side than an optical surface of the first optical component that is most adjacent to the reduction side.

DESCRIPTION OF THE PREFERRED EMBODIMENT

Figure 9:
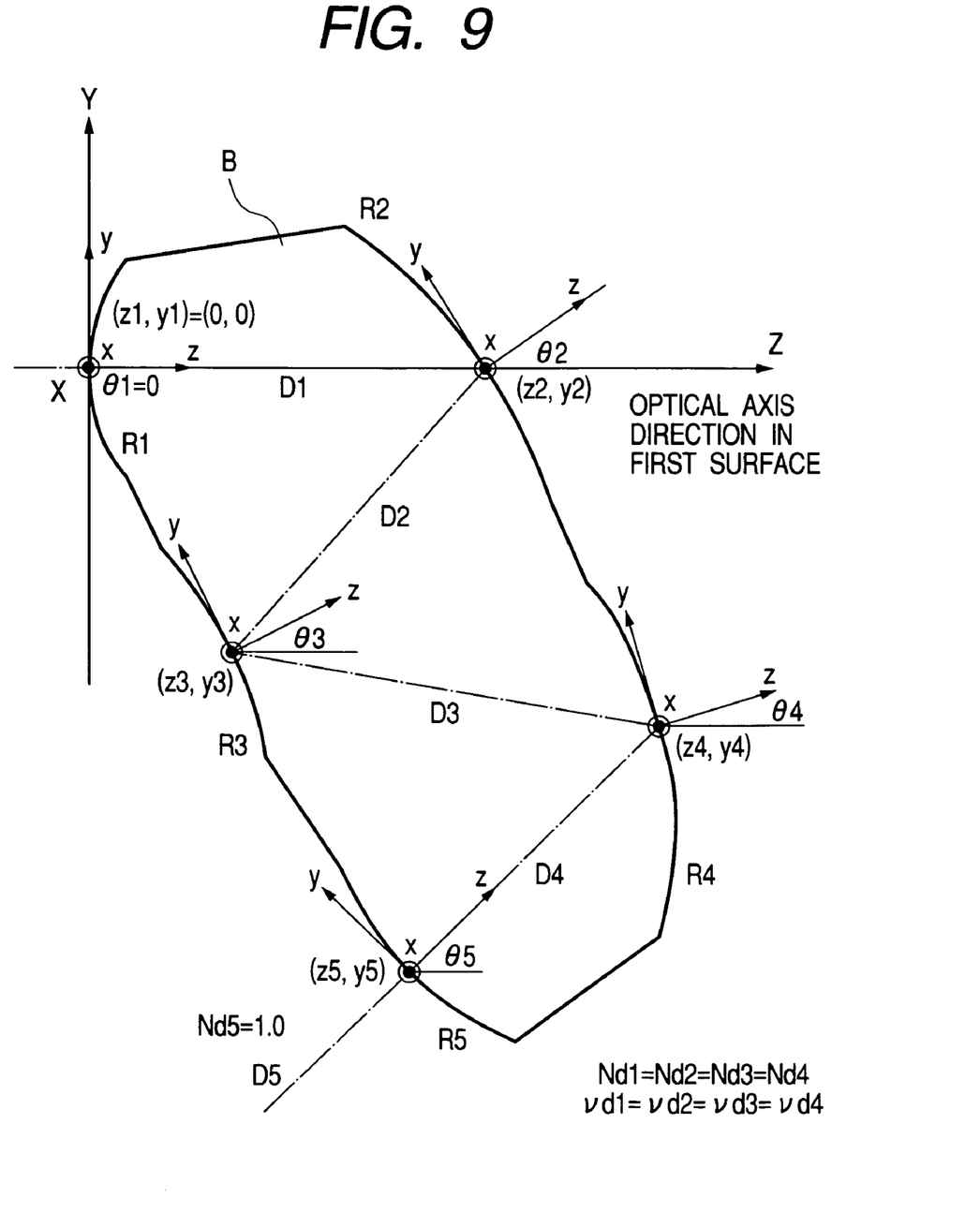
FIG. 9 is an illustration of a coordinate system.

Before explaining the embodiment of the present invention, explanation will be first made to the way of representing the constituent elements of the embodiment and the common items of the entire embodiment. FIG. 9 is an illustration of a coordinate system defining the construction data of an optical system. In the present embodiment, the ith surface along a ray (indicated by a dot-and-dash line in FIG. 9 and called the reference axis ray) travelling from the reduction side to the image plane on the enlargement side is defined as the ith surface. Also, in the present description, a plane onto which an image is projected is expressed as a screen or a predetermined image plane, and the projected image is expressed as an image, an image plane or an image field, and can be freely substituted for. Also, in the embodiment, description will be made in a form wherein the image is projected onto the predetermined image plane on the enlargement side with the reduction side as the object surface, but the image may be reduction-projected in a converse optical path.

In FIG. 9, the first surface R1 is a refracting surface, the second surface R2 is a reflecting surface tilted relative to the first surface R1, the third surface R3 and the fourth surface R4 are reflecting surfaces shifted and tilted relative to their respective preceding surfaces, and the fifth surface R5 is a refracting surface shifted and tilted relative to the fourth surface R4. The first surface R1 to the fifth surface R5 are constructed on an optical element formed of a medium such as glass or plastic, and in FIG. 9, the optical element is a first optical element B.

Accordingly, in the construction of FIG. 9, the medium from the object surface, not shown, to the first surface R1 is air, the medium from the first surface R1 to the fifth surface R5 is a certain common medium, and the medium from the fifth surface R5 to the sixth surface R6, not shown, is air.

The optical system of the present embodiment is an off-axial optical system and therefore, the respective surfaces constituting the optical system do not have a common optical axis. So, an absolute coordinate system having the center of the first surface as the origin is first set.

The route of a ray (reference axis ray) passing through the origin and the center of the last imaging plane is defined as the reference axis of the optical system. Further, the reference axis in the present embodiment has a direction (a sense). The direction is a direction in which the reference axis ray travels.

In the present embodiment, the reference axis which becomes the reference of the optical system is set as described above, but as regards the way of determining the axis which becomes the reference of the optical system, any convenient axis in settling aberrations or expressing each surface shape constituting the optical system can be adopted. Generally, however, the route of a ray passing through one of the center of the image plane, the center of a stop or an entrance pupil or an exit pupil or the first surface of the optical system and the center of the last surface is set as the reference axis which becomes the reference of the optical system.

That is, in the present embodiment, as regards the reference axis, a route in which a ray (reference axis ray) passing through the central point of the first surface to the center of the last imaging plane is refracted and reflected by each refracting surface and reflecting surface is set as the reference axis. The order of the respective surfaces is set to the order in which the reference axis ray is subjected to refraction and reflection.

Accordingly, the reference axis finally reaches the center of the image plane while changing its direction in accordance with the law of refraction or reflection along the set order of the respective surfaces. Also, the reduction side, the panel surface side, the object surface side, and the enlargement side, the predetermined image plane side, the screen side mean on which side the object exists along the direction of the reference axis.

Each axis of the absolute coordinate system of the optical system in each embodiment of the present invention is defined as follows.

Z-axis: a straight line passing through the origin and the center of the object surface. The direction from the object surface toward the first surface R1 is positive.

Y-axis: a straight line passing through the origin and forming counter-clockwisely 90° with respect to the Z-axis in the plane of the drawing sheet of FIG. 9 in accordance with the definition of the right-hand coordinate system.

X-axis: a straight line passing through the origin and perpendicular to the Z-axis and the Y-axis.

Also, to represent the surface shape and tilt angle of the ith surface constituting the optical system, it is easier to understand in recognizing the shape to set a local coordinate system in which a point at which the reference axis and the ith surface intersets with each other is the origin, represent the surface shape of the surface by the local coordinate system, and represent the tilt angle by the angle formed between the reference axis and the local coordinate system than to represent the shape and tilt angle of the surface by the absolute coordinate system and therefore, the surface shape of the ith surface is represented by the following local coordinate system. For that purpose, the following coordinate system on the reference axis is first set for any point on the reference axis.

zb axis: this passes through any point on the reference axis, and the direction of the reference axis is positive. At the deflection point of the reference axis, the incidence direction is positive.

yb axis: this is a straight line passing through any point on the reference axis, and forming counter-clockwisely 90° with respect to the zb axis in the plane of the drawing sheet of FIG. 9 in accordance with the definition of the right-hand coordinate system, and coincides with the Y-axis of the absolute coordinate system at the origin of the absolute coordinate system, and it is to be understood that thereafter, there is no rotation relative to the zb axis.

xb axis: a straight line passing through any point on the reference axis, and perpendicular to the zb axis and the yb axis.

Next, the local coordinate system is set.

z-axis: a surface normal passing through the origin of the local coordinates.

y-axis: a straight line passing through the origin of the local coordinates, and forming counter-clockwisely 90° with respect to the z direction in the plane of the drawing sheet of FIG. 9 in accordance with the definition of the right-hand coordinate system.

x-axis: a straight line passing through the origin of the local coordinates, and perpendicular to ybzb plane.

Figure 10:
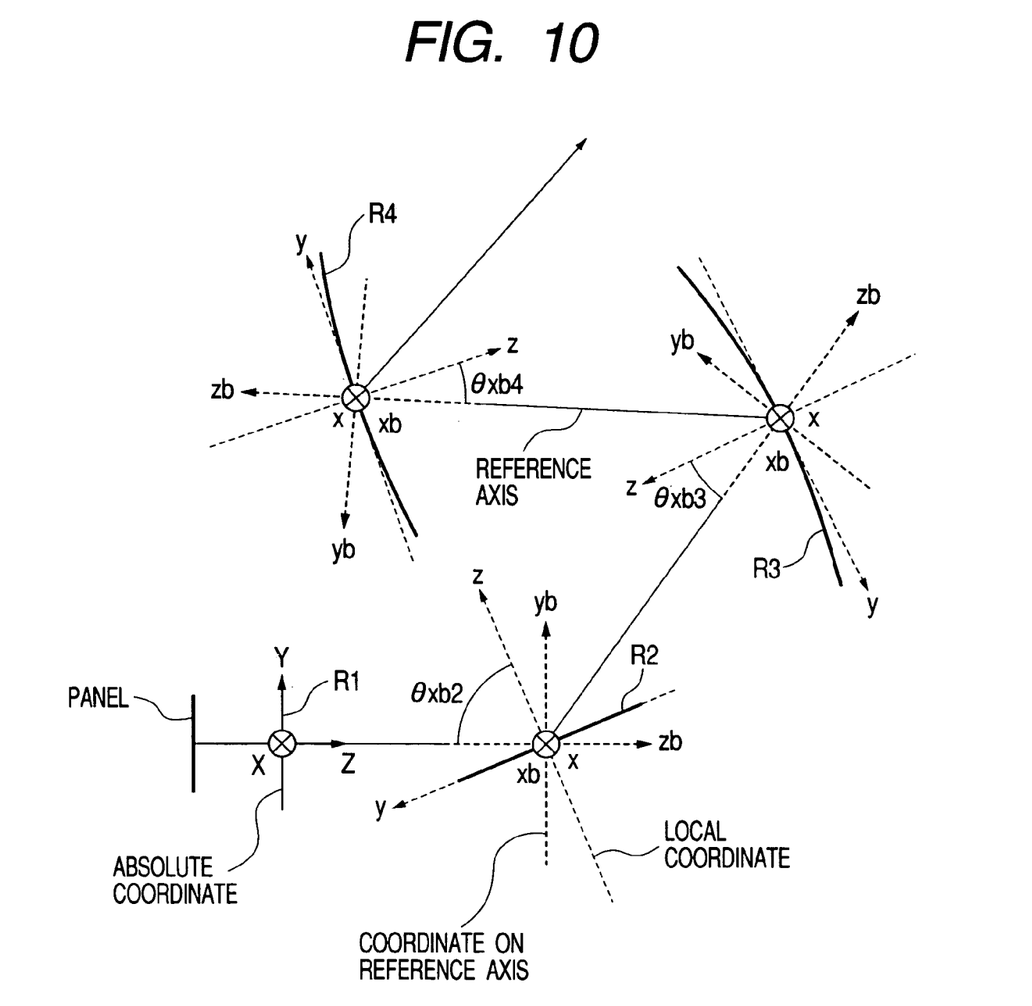
FIG. 10 is an illustration of an absolute coordinate system, a coordinate system on a reference axis, and a local coordinate system.

Accordingly, the tilt angle of the ith surface in ybzb plane is represented by an angle θxb,i (degrees) at which the z-axis of the local coordinate system defines the counter-clockwise direction at an acute angle with respect to the zb axis of the coordinate system on the reference axis as positive, the tilt angle of the ith surface in xbzb plane is represented by an angle θyb,i (degrees) at which the counter-clockwise direction with respect to the zb axis of the coordinate system on the reference axis is positive, and the tilt angle of the ith surface in xbyb plane is represented by an angle θzb,i (degrees) at which the counter-clockwise direction with respect to the yb axis of the absolute coordinate system is positive. However, usually θzb,i corresponds to the rotation of the surface and does not exist in the embodiments of the present invention. FIG. 10 represents the correlation among the absolute coordinate system, the coordinate system on the reference axis and the local coordinate system.

Also, Di represents the scalar amount representing the spacing between the origin of the local coordinate in the ith surface and the origin of the local coordinate in the (i+1)th surface, and $Ndi$ and $vdi$ represent the refractive index and Abbe number, respectively, of the medium between the ith surface and the (i+1)th surface.

Here, a spherical surface is a shape represented by the following expression:

$$Z = \frac{(x^2+y^2)/Ri}{1+\{1-(x^2+y^2)/Ri^2\}^{1/2}}$$

Also, the optical system of the present embodiment has at least one rotation-asymmetrical aspherical surface, the shape of which is represented by the following expression:

$Z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6$

The above-mentioned curved surface expression has only terms of even number orders with respect to x and therefore, the curved surface prescribed by the above-mentioned curved surface expression is of a surface-symmetrical shape having yz plane as a symmetrical surface. Further, when the following condition is satisfied, it represents a shape symmetrical with respect also to xz plane.

$C03=C21=C05=C23=C41=t=0$

Further, when $C02=C20\ C04=C40=C22/2\ C06=C60=C24/3=C42/3$ are satisfied, it represents a rotation-symmetrical shape. When the above-mentioned conditions are not satisfied, it represents a rotation-asymmetrical shape.

Figure 1A:
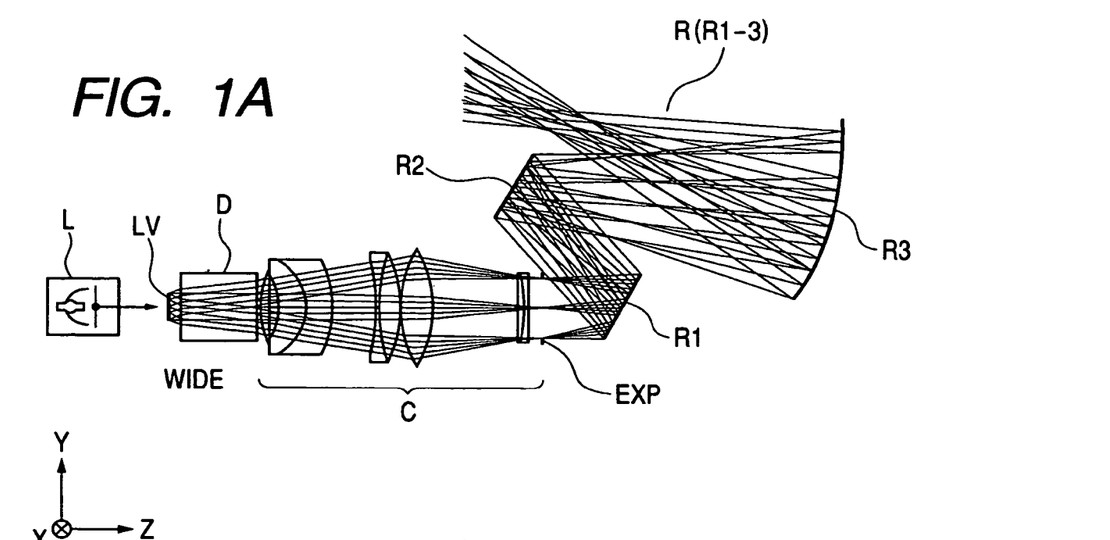
FIGS. 1A, 1B and 1C show the general construction of a variable power optical system according to an embodiment.
Figure 1B:
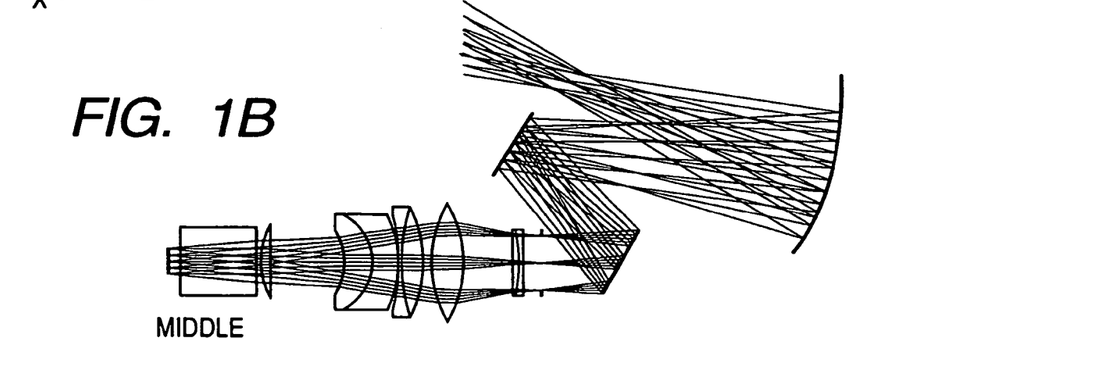
Figure 1C:
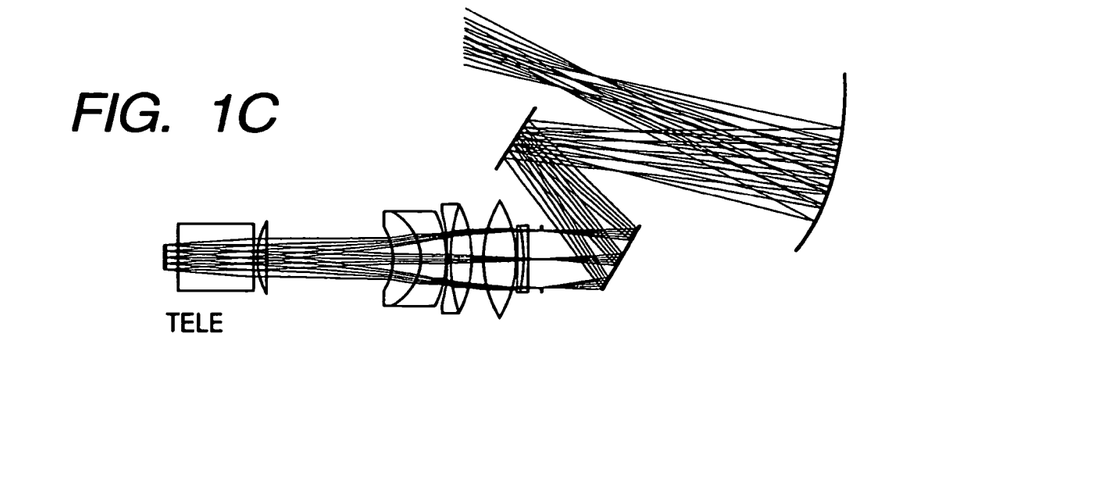
Figure 2A:
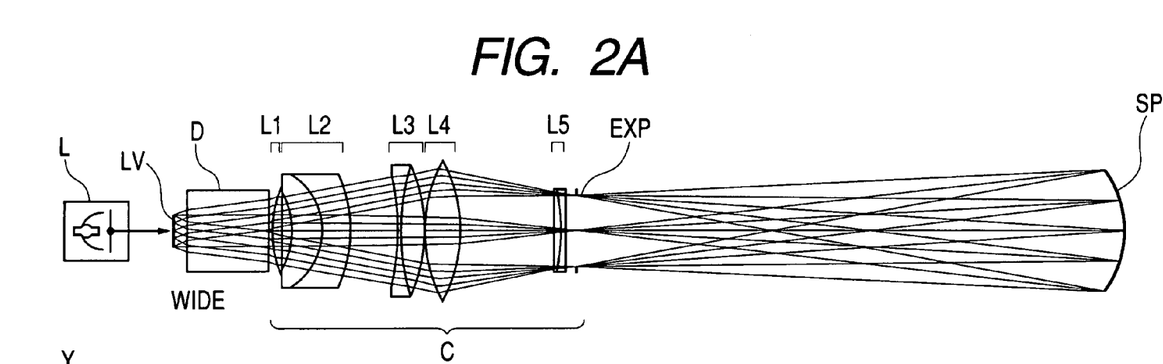
FIGS. 2A, 2B and 2C show the construction of the reduction side optical block of the variable power optical system shown in FIGS. 1A, 1B and 1C.
Figure 2B:
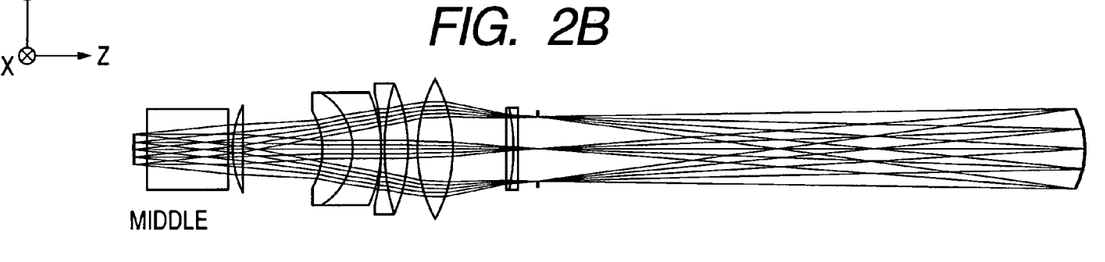
Figure 2C:
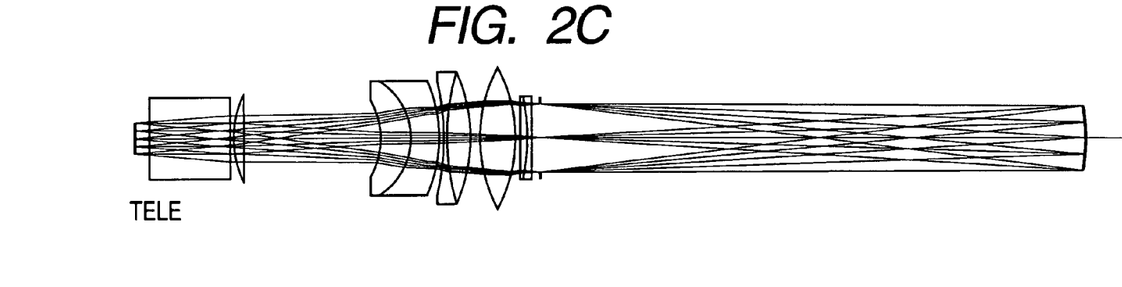
Figure 3:
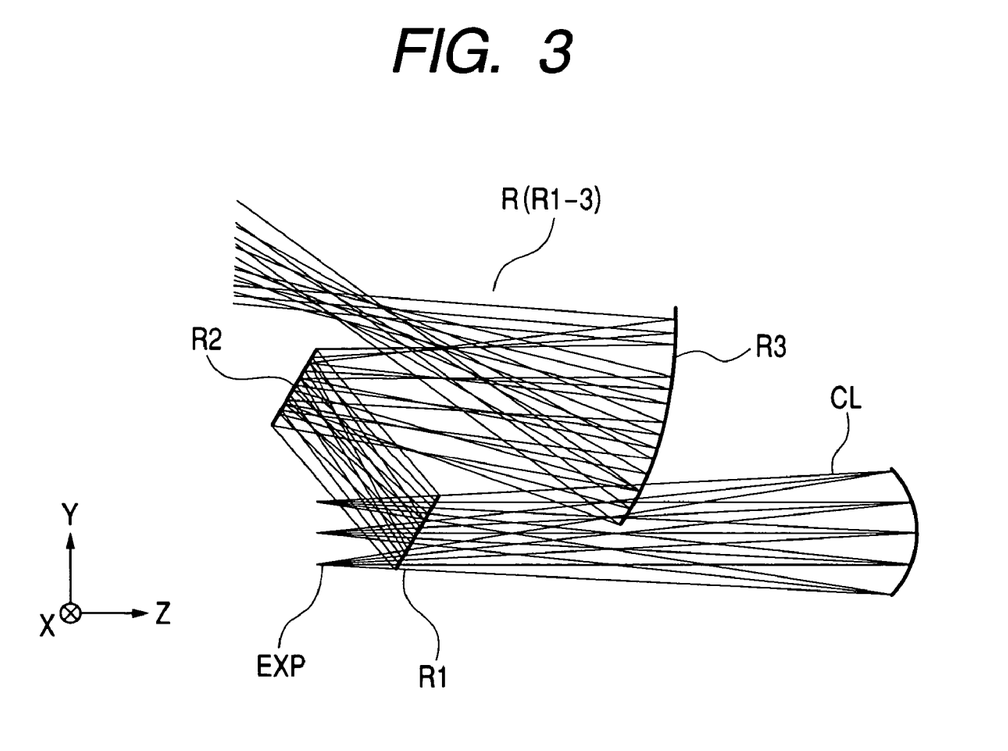
FIG. 3 shows an enlargement side optical block superposed on the imaging optical path of the reduction side optical block shown in FIGS. 2A, 2B and 2C.

The construction of the variable power optical system of the present embodiment will now be described with reference to FIGS. 1A, 1B and 1C, 2A, 2B and 2C, and 3. However, the numerical details thereof will be shown later. FIGS. 1A, 1B and 1C show the general construction of the optical system, FIGS. 2A, 2B and 2C show an optical path only in a reduction side optical block (second optical component) with an enlargement side optical block (first optical component) excluded from FIG. 1, and FIG. 3 shows the enlargement side optical block superposed on the imaging optical path of the reduction side optical block shown in FIGS. 2A to 2C. In FIGS. 1A and 2A show the state at the wide angle end, FIGS. 1B and 2B show the state at the middle focal length, and FIGS. 1C and 2C show the state at the telephoto end.

In FIGS. 1A to 3, reference letter L designates an illuminating system which illuminates an image display panel (light valve) LV using transmission type liquid crystal, reflection type dot matrix liquid crystal, a digital micromirror device or the like. The illuminating system L comprises a lamp, a condenser lens, a filter for selecting a wavelength, etc., but is omitted in FIGS. 1B, 1C, and FIGS. 2B and 2C. Reference letter D denotes a dichroic optical element for combining color lights correspondingly to a three-plate type image display panel. As described above, the optical system of the present embodiment is an optical system for the three-plate type, but in FIGS. 1A, 1B and 1C, it is omitted and the optical path of an image display panel alone is shown. In the following, description is made on the premise that as previously described, the light travels from the image display panel LV side (the reduction side) to a screen side (the enlargement side), not shown, onto which the image of the image display panel LV is projected.

Reference letter C designates a reduction side optical block corresponding to the second optical component, and it is constituted by a rotation-symmetrical coaxial lens having a power variable function (focal length changing function). The optical block C effects the focal length change from the wide angle end (short focal length end) to the telephoto end (long focal length end) by a lens unit constituting it being moved along the optical axis thereof. Reference letter R denotes an enlargement side optical block corresponding to the first optical component. R1 to R3 constituting the optical block R are off-axial reflecting surfaces and are so disposed as to be decentered to one another. The reflecting surfaces R1 to R3 constituting the optical block R are immovable during a variable power operation such as zooming. The exit pupil of the optical block C and the entrance pupil of the optical block R coincide with each other, and EXP is the pupil of the variable power optical system, and corresponds to the exit pupil of the optical block C and the entrance pupil of the optical block R, and an aperture stop is disposed therein. That is, the pupil EXP of the variable power optical system is located more toward the reduction side than the optical block R and more toward the enlargement side than the image display panel LV corresponding to the reduction side conjugate point. "More toward the reduction side than the optical block R" means "more toward the reduction side than the optical surface of the optical block R which is most adjacent to the reduction side".

In Japanese Patent Application Laid-Open No. H09-222561 described in the background statement, an image is formed between the coaxial optical system (corresponding to the optical block C in the present embodiment and the reflecting optical system (corresponding to the optical block R in the present embodiment), but in the present embodiment, the image of the image display panel LV by the reduction side optical block C is formed as a real image at a position which is located at the enlargement side of the optical block C, at the enlargement side than an optical surface of the first optical block (i.e. the reflecting surface R1) that is most adjacent to the reduction side, and in the optical path of the optical block R. That is, the pupil is located more toward the reduction side than the optical block R and more toward the enlargement side than the image display panel LV, whereby this intermediate image and the optical path to the image are partly duplexly absorbed by the optical path of the enlargement side optical block R and therefore, as compared with the example of the prior art in which an image has been formed and relayed between the optical blocks, the entire optical system can be constructed compactly. Also, the reflecting surface of the optical block R which is more toward the reduction side than the intermediate image comes to share the imaging action by the optical block C and thus, various aberrations including chromatic aberration of magnification are suppressed. Also, it can be disposed without the eclipse of the ray and therefore, brightness is not spoiled over the peripheral portion of the image plane.

The detailed construction of the reduction side optical block C will now be described with reference to FIGS. 2A, 2B and 2C. In FIG. 2A, reference letters L1 to L5 designate lens units constituting the optical block C, and the optical block C is comprised, in succession from the reduction side, of a stationary lens unit L1 comprising a lens having positive power (the inverse number of the focal length), a movable lens unit L2 comprising a cemented lens having negative power, a movable lens unit L3 comprising a cemented lens having negative power, a movable lens unit L4 comprising a rotation-symmetrical aspherical lens having positive power, and a movable lens unit L5 comprising a cemented lens having negative power, and has positive power as a whole. However, the positiveness and negativeness of the power of the lens units L1 to L5 are not restricted thereto.

As shown in FIGS. 2A to 2C, the image of the image display panel is formed into the shape of a spherical surface SP by the reduction side optical block C only. The lens units L2 to L5 are moved to thereby effect the enlargement or reduction of this spherical image. This spherical image is subjected to conversion so as to be imaged in a plane on a predetermined image plane (screen) by the enlargement side optical block R. However, the optical block C may form a plane image, and may re-image from a plane to another by the enlargement side optical block R.

FIG. 3 shows a state in which the optical paths of the optical block R are superposed while the imaging beam of the optical block C shown in FIGS. 2A, 2B and 2C remains shown. The optical paths of the two optical blocks are combined so that the exit pupil of the optical block C and the entrance pupil of the optical block R may coincide with each other. Actually, as shown in FIGS. 1A, 1B and 1C, the imaging beam by the optical block C is directed to the optical block R, and is turned back by each reflecting surface. Because of a construction as shown in FIG. 3 wherein the imaging plane of the optical block C is incorporated into the interior of the enlargement side optical block R, the optical system can be constructed compactly even if the focal length of the optical block C is lengthened and a magnification of a great absolute value is given.

Also, in the present embodiment, the reflecting surfaces R1 to R3 constituting the enlargement side optical block R are disposed in the air and therefore chromatic aberration does not occur. Even if the enlargement side optical block R is filled with an optical material such as glass or plastic, it is possible to suppress chromatic aberration as described in Japanese Patent Application Laid-Open No. H09-222563 (corresponding U.S. Pat. No. 6,549,332B) and Japanese Patent Application Laid-Open No. H10-221604 (corresponding U.S. Pat. No. 6,097,550B).

Figure 4A:
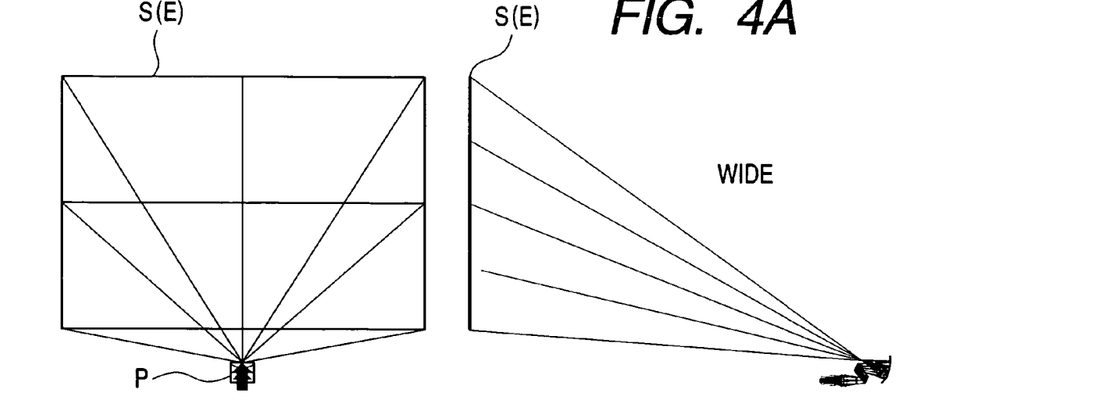
FIGS. 4A, 4B and 4C show the manner of projection at each variable power position of the variable power optical system according to the present embodiment.
Figure 4B:
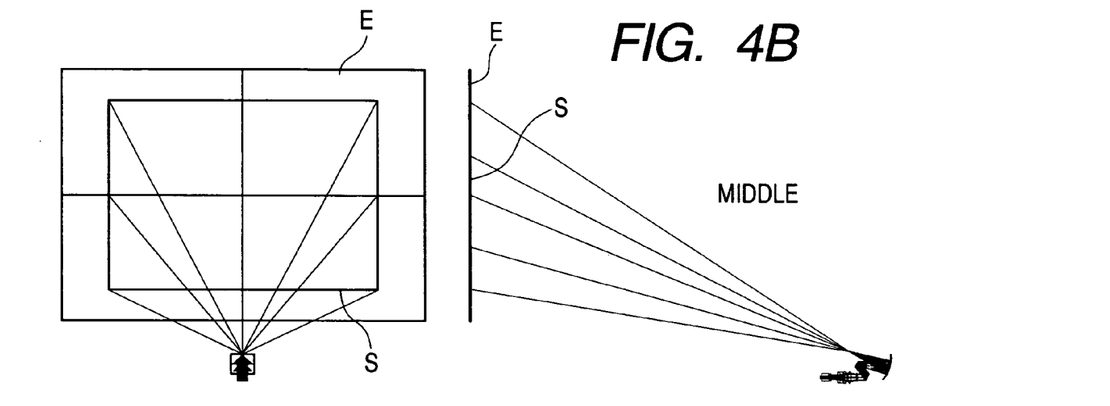
Figure 4C:
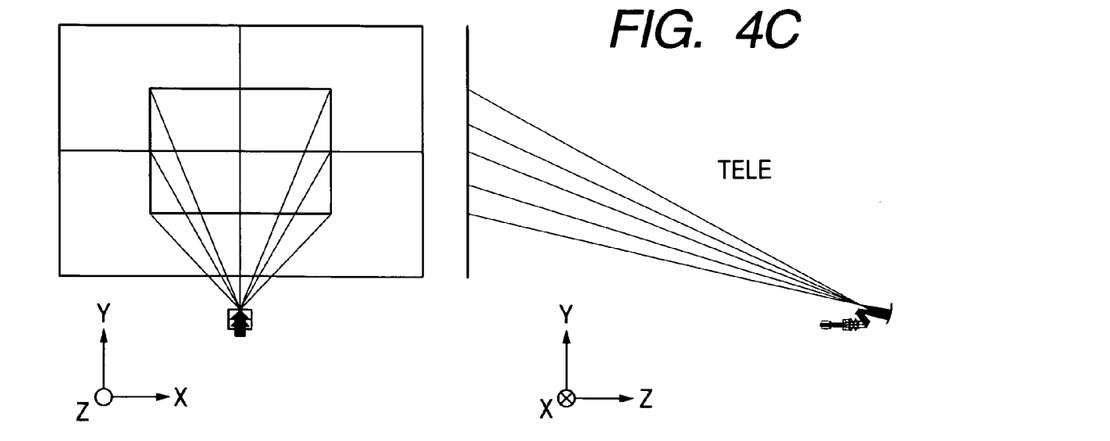

FIGS. 4A, 4B and 4C show the manner of projection at each variable power position of the variable power optical system of the present embodiment, and FIG. 4A shows the state at the wide angle end, FIG. 4B shows the state at the middle focal length, and FIG. 4C shows the state at the telephoto end.

In FIGS. 4A, 4B, 4C and 4D, reference letter P designates the variable power optical system of the present embodiment, reference letter E denotes a screen (a predetermined image plane), and reference letter S designates an image plane (an image field). Also, the size of the image display panel LV is 0.7 inch (10.668×14.224 mm) at a length and breadth ratio of 3:4, and this optical system is a double zoom optical system in which the projection distance along the reference axis from the variable power optical system P to the image plane S (the distance from the center of the exit pupil of the optical system P to the center of the image plane S) is about 1700 mm to assume 70 inches (1422.4×1066.8 mm) at the wide end to 35 inches (711.2×533.4 mm) at the telephoto end. The variable power optical system of the present embodiment is telecentric on the image display panel side.

At this time, the focal length of the reduction side optical block C is 46.87 mm to 92.85 mm from the wide angle end, and the values of the magnification thereof is −4.08, −3.07 and −2.05 (the wide angle end, the middle position and the telephoto end). That is, when the magnification of the optical block C when the ray is traced from the reduction side to the enlargement side is defined as b1, the condition that $$b1 < -1$$

is satisfied. As described above, the reduction side optical block C is made to share a magnification smaller than −1 (a magnification great as an absolute value), whereby the enlargement of the aberrations in the enlargement side optical block R can be suppressed. When the magnification of the optical block C is greater than −1 and smaller than 0, the enlargement side optical block enlarges the various aberrations occurring in the optical block C at a very great magnification, and this is not preferable in suppressing the occurrence of aberrations. When in the present embodiment, without any description, use is made of the expression that the magnification is high (great) or low (small), it means that the absolute value is great or small.

The construction data of the variable power optical system of the present embodiment will be shown below.

TABLE 1

| object side numerical value opening | | |
|---|---|---|
| wide angle end | middle | telephoto end |
| 0.250 | 0.1875 | 0.1250 |

TABLE 2 surface dispositions at the wide angle end

| Surface | Xi | Yi | Zi | Di | θxb, i | θyb, i | Ndi | vdi |
|---|---|---|---|---|---|---|---|---|
| 1 | 0.00 | 0.00 | 0.00 | 28.00 | 0.00 | 0.00 | 1.743972 | 44.85 |
| 2 | 0.00 | 0.00 | 28.00 | 1.50 | 0.00 | 0.00 | | |
| 3 | 0.00 | 0.00 | 29.50 | 3.49 | 0.00 | 0.00 | 1.633748 | 38.11 |
| 4 | 0.00 | 0.00 | 32.99 | 3.24 | 0.00 | 0.00 | | |
| 5 | 0.00 | 0.00 | 36.23 | 10.00 | 0.00 | 0.00 | 1.743972 | 44.85 |
| 6 | 0.00 | 0.00 | 46.23 | 10.00 | 0.00 | 0.00 | 1.745569 | 31.80 |
| 7 | 0.00 | 0.00 | 56.23 | 16.28 | 0.00 | 0.00 | | |
| 8 | 0.00 | 0.00 | 72.51 | 1.20 | 0.00 | 0.00 | 1.753398 | 29.37 |
| 9 | 0.00 | 0.00 | 73.71 | 8.45 | 0.00 | 0.00 | 1.487490 | 70.41 |
| 10 | 0.00 | 0.00 | 82.17 | 0.10 | 0.00 | 0.00 | | |
| 11 | 0.00 | 0.00 | 82.27 | 12.48 | 0.00 | 0.00 | 1.509931 | 68.07 |
| 12 | 0.00 | 0.00 | 94.74 | 32.73 | 0.00 | 0.00 | | |
| 13 | 0.00 | 0.00 | 127.48 | 2.31 | 0.00 | 0.00 | 1.755201 | 27.58 |
| 14 | 0.00 | 0.00 | 129.79 | 1.20 | 0.00 | 0.00 | 1.726897 | 44.74 |
| 15 | 0.00 | 0.00 | 130.99 | 35.00 | 0.00 | 0.00 | | |
| 16 | 0.00 | 0.00 | 165.99 | 65.24 | −26.00 | 0.00 | | |

TABLE 2-continued surface dispositions at the wide angle end

| Surface | Xi | Yi | Zi | Di | θxb, i | θyb, i | Ndi | vdi |
|---|---|---|---|---|---|---|---|---|
| 17 | 0.00 | 51.41 | 125.82 | 119.34 | 21.93 | 0.00 | | |
| 18 | 0.00 | 34.50 | 243.96 | 1819.28 | −7.74 | 0.00 | | |
| 19 | 0.00 | 763.72 | −1,422.78 | | | | | |

TABLE 3 radius of curvature of (spherical) surface

| | | |
|---|---|---|
| 1st surface | D1 surface | flat surface |
| 2nd surface | D2 surface | flat surface |
| 3rd surface | C1 surface | 51.26475 |
| 4th surface | C2 surface | −452.37186 |
| 5th surface | C3 surface | −31.71640 |
| 6th surface | C4 surface | −25.20060 |
| 7th surface | C5 surface | −55.22595 |
| 8th surface | C6 surface | −111.70363 |
| 9th surface | C7 surface | 77.97774 |
| 10th surface | C8 surface | −64.88973 |
| 11th surface | C9 surface | 54.55639 |
| 12th surface | C10 surface | −45.60450 |
| 13th surface | C11 surface | −857.55314 |
| 14th surface | C12 surface | −70.38116 |
| 15th surface | C13 surface | 184.22618 |

TABLE 4 aspherical surface

| | 11th surface (surface C9) | 12th surface (surface C10) |
|---|---|---|
| K | −1.101400E+00 | −1.404277E+00 |
| A | −7.411510E−07 | 5.110120E−07 |
| B | 2.004590E−10 | 3.812590E−11 |
| C | 1.211020E−12 | 8.078430E−13 |
| D | −2.913400E−15 | −2.446000E−15 |

| | 16th surface (surface R1) | 17th surface (surface R2) | 18th surface (surface R3) |
|---|---|---|---|
| C02 | −7.6817E−04 | −1.4288E−03 | −3.7384E−03 |
| C03 | −4.6677E−06 | −4.4092E−05 | −2.0569E−06 |
| C04 | −7.2932E−08 | −5.8199E−07 | −5.1503E−10 |
| C05 | −8.8808E−10 | −2.2496E−08 | 1.5486E−11 |
| C06 | −7.1686E−12 | −7.9679E−10 | 4.3651E−13 |
| C20 | −5.4816E−04 | −2.4498E−04 | −4.3789E−03 |
| C21 | −5.0926E−06 | −3.2496E−05 | −4.0971E−06 |
| C22 | −1.8460E−07 | −7.6650E−07 | 1.3535E−08 |
| C23 | −4.6821E−09 | −4.1937E−08 | 1.2236E−10 |
| C24 | 8.4099E−11 | −1.0567E−09 | 9.7033E−13 |
| C40 | −1.1909E−07 | −1.4020E−07 | 3.3228E−08 |
| C41 | −3.5784E−09 | −1.8039E−08 | −5.3496E−11 |
| C42 | −2.0315E−10 | −8.9109E−10 | −7.1899E−13 |
| C60 | −1.6808E−10 | −4.4718E−10 | −5.4472E−12 |

TABLE 5 focal length change moving surface interval Di

| surface | wide angle end | middle | telephoto end |
|---|---|---|---|
| 4 | 3.24 | 27.24 | 46.69 |
| 7 | 16.28 | 0.10 | 1.25 |
| 10 | 0.10 | 3.59 | 4.21 |
| 12 | 26.74 | 14.24 | 1.86 |
| 15 | 5.00 | 7.73 | 5.00 |

Figure 5A:
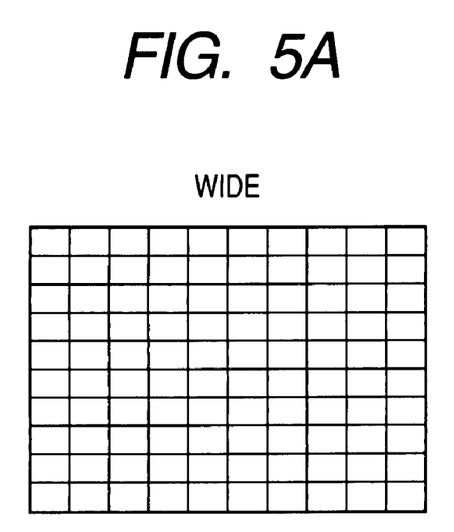
FIGS. 5A, 5B and 5C are illustrations showing the distortion of the variable power optical system according to the present embodiment.
Figure 5B:
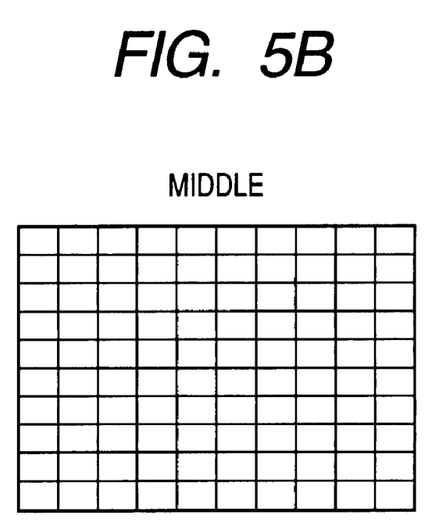
Figure 5C:
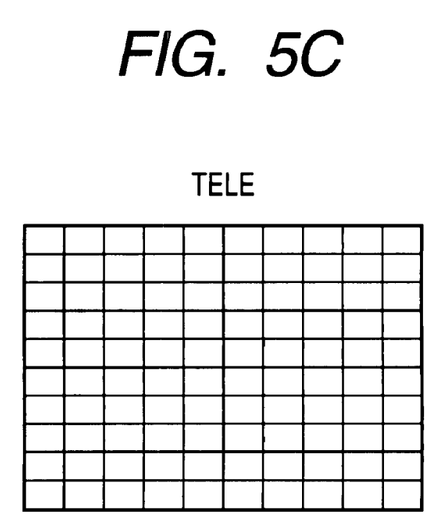
Figure 6:
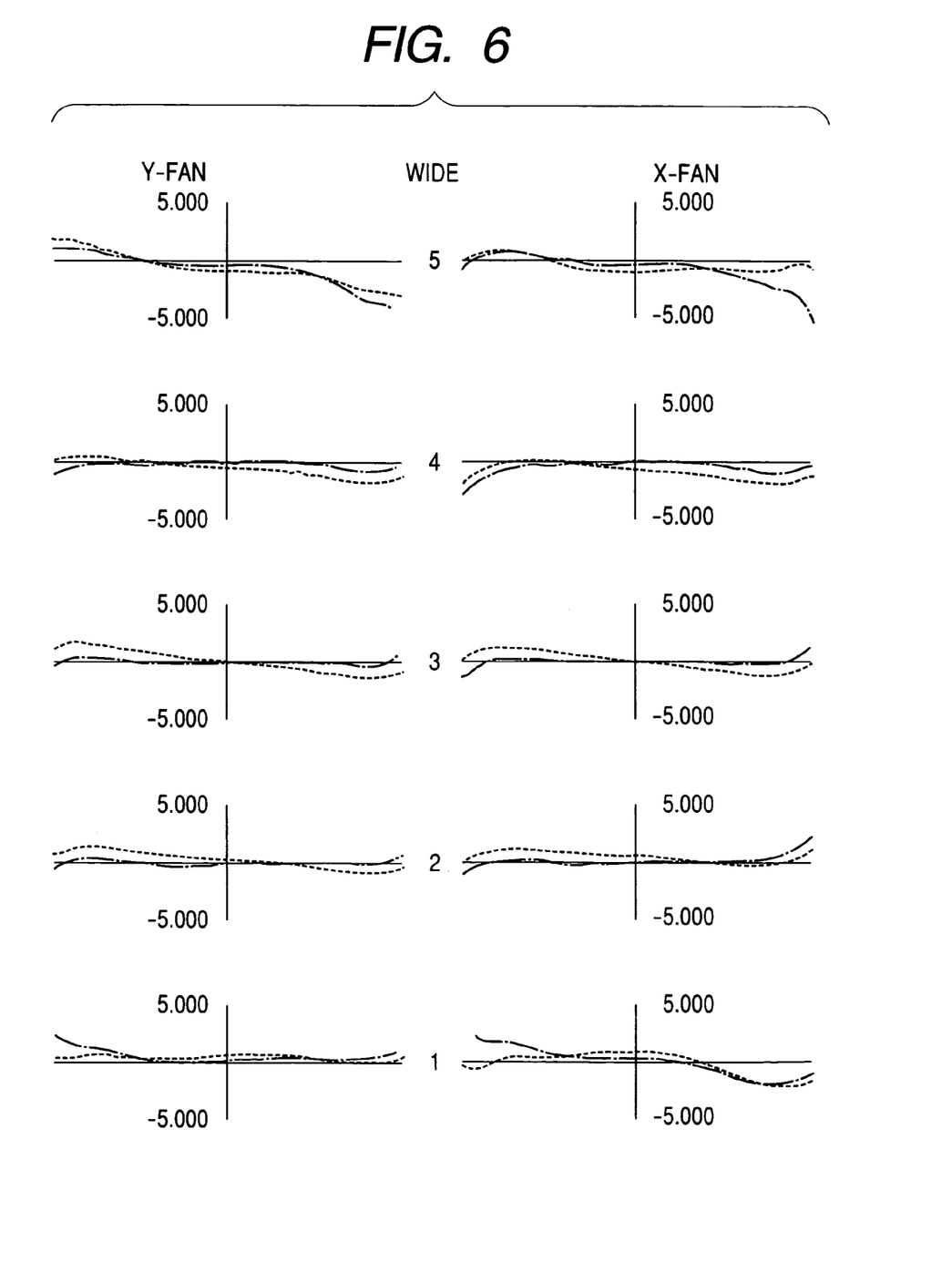
FIG. 6 is an illustration showing lateral aberrations at the wide end of the variable power optical system according to the present embodiment.
Figure 7:
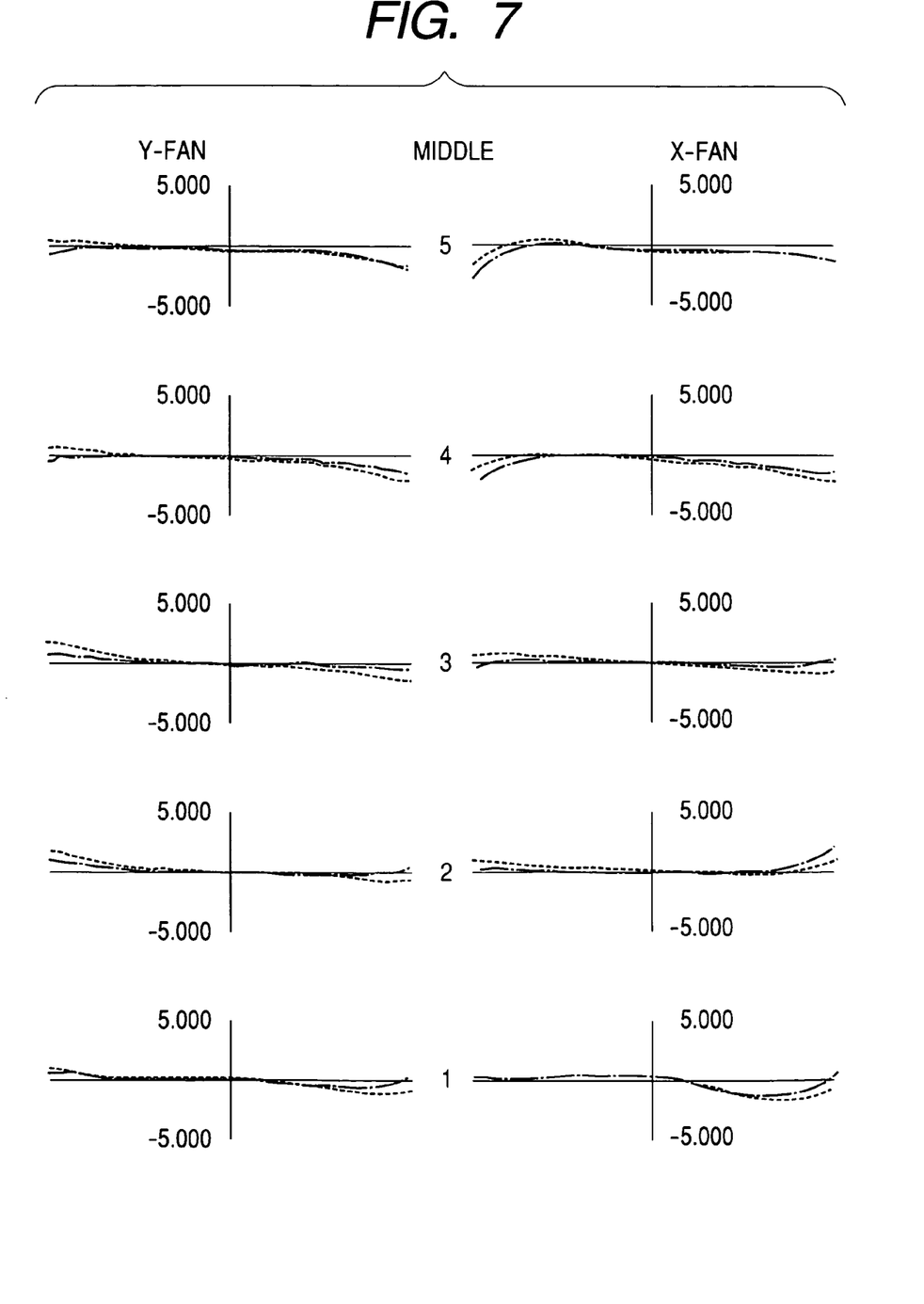
FIG. 7 is an illustration showing lateral aberrations at the middle position of the variable power optical system according to the present embodiment.
Figure 8:
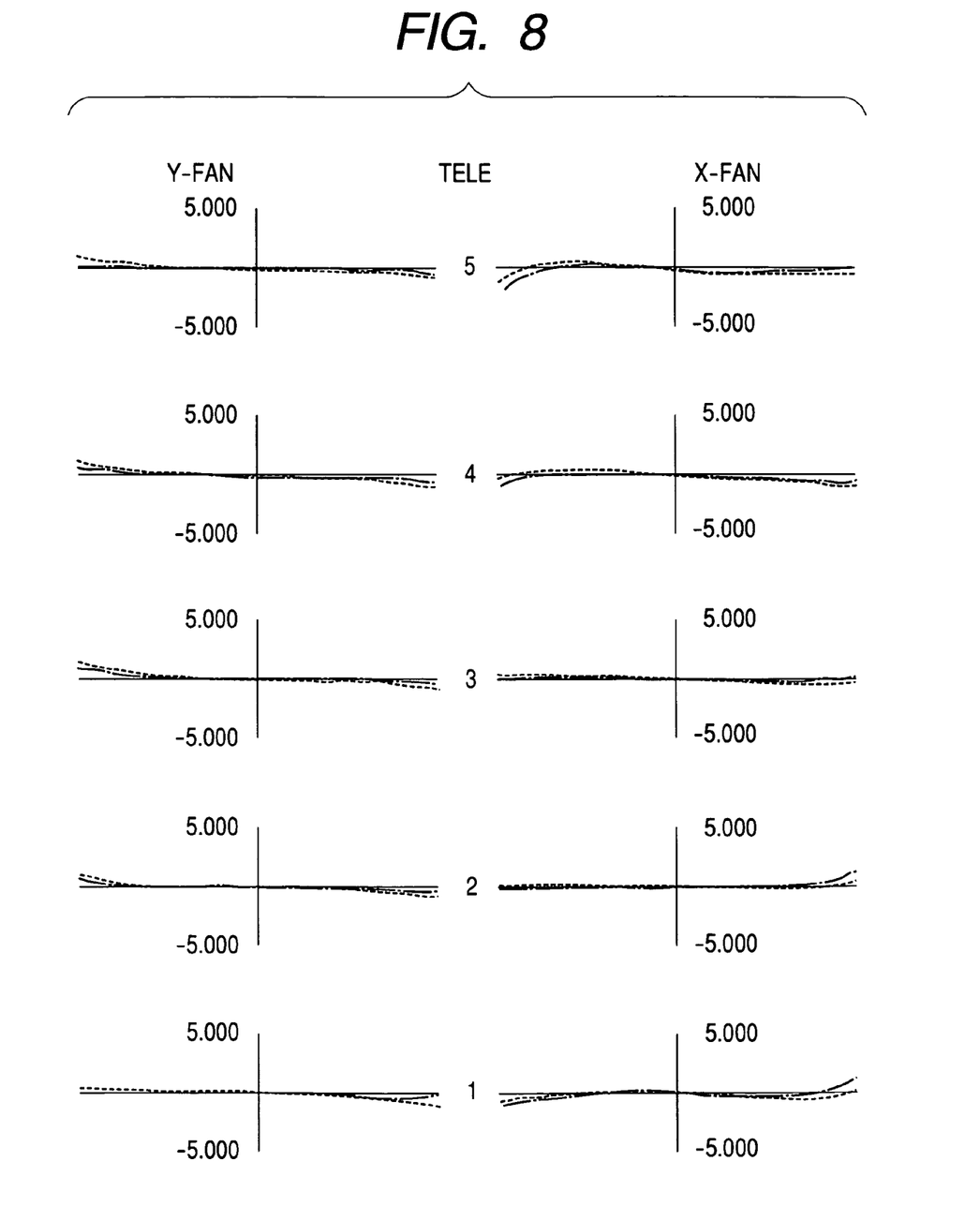
FIG. 8 is an illustration showing lateral aberrations at the telephoto end of the variable power optical system according to the present embodiment.
Figure 11:
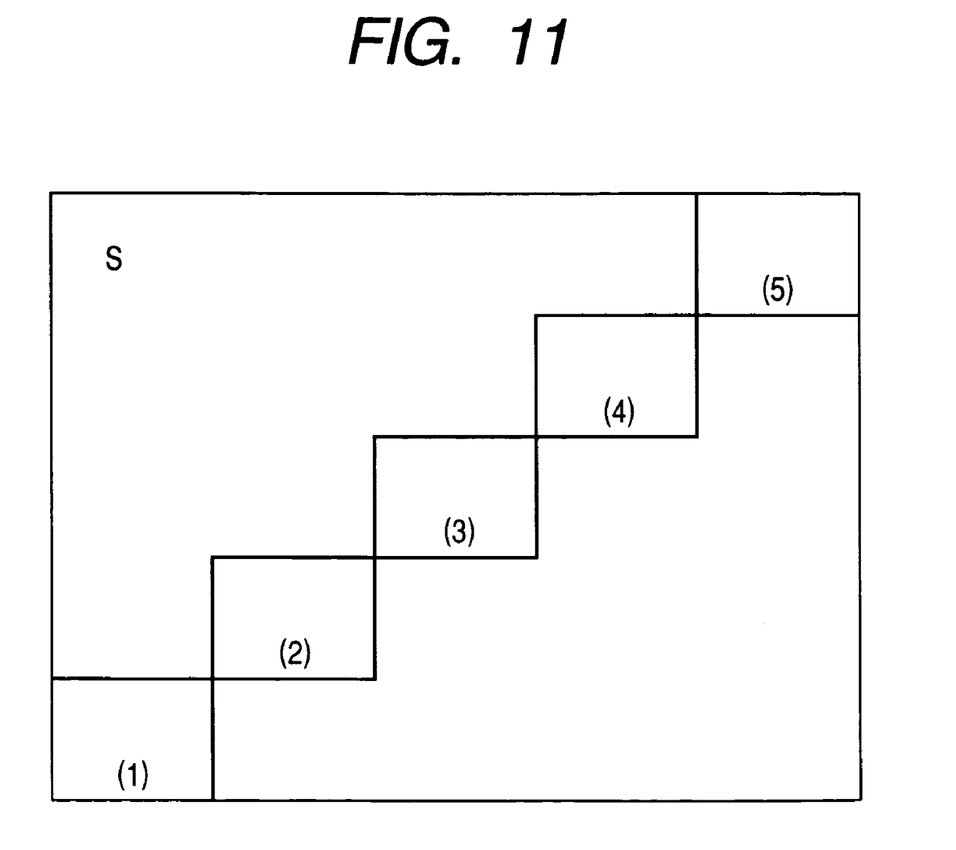
FIG. 11 is an illustration showing the evaluating positions of the lateral aberrations.

The states of distortion at the wide angle end, the middle position and the telephoto end in the variable power optical system of the present embodiment are shown in FIGS. 5A, 5B and 5C, respectively. Also, lateral aberrations at the wide end, the middle position and the telephoto end at the evaluation positions (1) to (5) in FIG. 11 are shown in FIGS. 6, 7 and 8, respectively. As will be seen from FIGS. 5A to 5C, there is no great distortion and asymmetrical distortion is little. The definition of the axes of the lateral aberration graphs of FIGS. 6, 7 and 8 is that the axis of abscissas is the x- or y-axis on the pupil surface, and the axis of ordinates means the amount of aberration on the screen. It will be seen that good imaging is accomplished.

As described above, in the variable power optical system disclosed in the present embodiment, the variable power function is performed by the reduction side refracting system (optical block C), whereby a variable power is possible by a simple technique called the movement of the lens and further, the magnification can be earned by the enlargement side reflecting system (optical block R) and therefore, a variable power optical block realizing a high variable power ratio relatively easily and yet being compact and having high performance can be achieved as the reduction side optical block. Furthermore, a reflecting system is used as the enlargement side optical block, whereby even in an optical system of a high magnification as a whole, it is possible to suppress chromatic aberration of magnification liable to occur in the conventional refracting system.

Also, the magnification of the reduction side optical block is always made smaller than −1 during a variable power operation, whereby it is possible to prevent the magnification of the enlargement side optical block from becoming high, and suppress the enlargement of aberrations.

Also, if the enlargement side optical block is made into an off-axial reflecting optical system, the asymmetry of the system can be generated and light can be obliquely projected and imaged on a predetermined image plane and therefore, there can be achieved an optical system of a smaller volume than the conventional type in which an object is projected by the use of a part of an optically ensured angle of view. Also, in front projection, the present invention is effective for the securement of the observer's field of view and an improvement in the degree of freedom of the installation position of a projection apparatus, and in rear projection, the degree of freedom of the layout of the optical system increases and this is effective for downsizing.

What is claimed is:

1. A variable power optical system for enlarging and projecting a reduction side object onto an enlargement side image plane, or reducing and projecting an enlargement side object onto a reduction side image plane, comprising:
   a first optical component having a reflecting curved surface; and
   a second optical component disposed more toward the reduction side than said first optical component, said second optical component having a plurality of movable lens units, and effecting a variable power operation by movement of said plurality of lens units;

wherein when a ray is traced from the reduction side toward the enlargement side, said second optical component forms an image of a reduction side conjugate point more towards the enlargement side than an optical surface of said first optical component that is most adjacent to the reduction side, and wherein a pupil of said second optical component is located between said first optical component and said second optical component.

2. A variable power optical system according to claim 1, wherein when a ray is traced from the reduction side toward the enlargement side, said second optical component forms an image of the reduction side conjugate point within said first optical component.

3. A projector comprising:

an image display unit; and a variable power optical system according to claim 1, said variable power optical system projecting an image of said image display unit.

4. A variable power optical system for enlarging and projecting a reduction side object onto an enlargement side image plane, or reducing and projecting an enlargement side object onto a reduction side image plane, comprising:

a first optical component having a reflecting curved surface; and a second optical component disposed more toward the reduction side than said first optical component, said second optical component having a plurality of movable lens units, and effecting a variable power operation by movement of said plurality of lens units;

wherein when a ray is traced from the reduction side toward the enlargement side, said second optical component forms an image of a reduction side conjugate point more towards the enlargement side than an optical surface of said first optical component that is most adjacent to the reduction side, and wherein when a ray is traced from the reduction side toward the enlargement side, the magnification b 1 of said second optical component satisfies a condition that $$b1 < -1$$

at any variable power position.

5. A variable power optical system according to claim 4, wherein a pupil of said variable power optical system is located more toward the reduction side than said first optical component and more toward the enlargement side than the reduction side conjugate point.

6. A projector comprising:

an image display unit; and a variable power optical system according to claim 4, said variable power optical system projecting an image of said image display unit.

* * * * *